US008783657B2

(12) United States Patent
Yang et al.

(10) Patent No.: US 8,783,657 B2
(45) Date of Patent: Jul. 22, 2014

(54) TOP ENTRY PLASTIC BALL VALVE (75) Inventors: Jiyue Yang, Guangdong (CN); Hongbin Huang, Guangdong (CN)

(73) Assignee: Guangdong Liansu Technology Industrial Co., Ltd., Foshan (CN)

( * ) Notice: Subject to any disclaimer, the term of this patent is extended or adjusted under 35 U.S.C. 154(b) by 270 days.

(21) Appl. No.: 13/320,382

(22) PCT Filed: Aug. 21, 2009

(86) PCT No.: PCT/CN2009/073416
§ 371 (c)(1),
(2), (4) Date: Nov. 14, 2011

(87) PCT Pub. No.: WO2010/148583
PCT Pub. Date: Dec. 29, 2010

(65) Prior Publication Data
US 2012/0080632 A1 Apr. 5, 2012

(30) Foreign Application Priority Data
Jun. 23, 2009 (CN) .......................... 2009 1 0040462

(51) Int. Cl.
*F16K 5/06* (2006.01)
(52) U.S. Cl.
USPC ................................. 251/315.12; 137/315.19
(58) Field of Classification Search
USPC ............ 137/315.17, 315.18, 315.19, 315.21; 251/315.01, 315.18, 315.1, 315.11, 251/315.12, 315.15
See application file for complete search history.

(56) References Cited

U.S. PATENT DOCUMENTS

| 1,906,266 | A | * | 5/1933 | Hoffman | 251/286 |
| 3,146,988 | A | * | 9/1964 | Riopelle et al. | 251/315.12 |
| 3,398,925 | A | * | 8/1968 | Scaramucci | 251/148 |
| 4,072,161 | A | | 2/1978 | Schoeneweis et al. | |
| 4,601,308 | A | * | 7/1986 | Stone et al. | 137/315.21 |
| 4,815,701 | A | * | 3/1989 | Stone | 251/174 |
| 5,313,976 | A | * | 5/1994 | Beasley | 137/15.22 |
| 5,396,922 | A | | 3/1995 | Ottens | |
| 8,424,837 | B2 | * | 4/2013 | Bugatti | 251/96 |

FOREIGN PATENT DOCUMENTS

| CN | 2061233 U | 8/1990 |
| CN | 1141404 A | 1/1997 |

(Continued)

OTHER PUBLICATIONS

International Search Report for PCT/CN2009/073416, dated Apr. 1, 2010.

*Primary Examiner* — John K Fristoe, Jr.
*Assistant Examiner* — R. K. Arundale
(74) *Attorney, Agent, or Firm* — Pearne & Gordon LLP (57) ABSTRACT

A top entry plastic ball valve comprises a valve stem cap (1), a valve stem (2), a valve stem sealing ring (3), a valve ball sealing ring (5), a supporting ring (6) for the valve ball sealing ring, a valve ball (7), a connecting pipe (8), and a valve body (9). A hollow valve ball chamber (911) is provided inside the valve body (9), the valve body (9) is provided with a valve cover hole (912) just above the valve ball chamber (911), and the width of the valve cover hole (912) is larger than the diameter of the valve ball (7). The ball valve also comprises a valve cover (4), which is provided with a valve stem shaft hole (410) for allowing the valve stem (2) to pass through and corresponds to the valve cover hole (912) so that the valve cover (4) can cover the valve cover hole (912) and can be fusion-bonded to the valve body (9), thereby avoiding the need for electric fusion welding process in the manufacture of large-diameter ball valves.

6 Claims, 4 Drawing Sheets

(56) References Cited

FOREIGN PATENT DOCUMENTS

| CN | 1043074 | C | 4/1999 |
|---|---|---|---|
| CN | 2644803 | Y | 9/2004 |
| CN | 1285848 | C | 11/2006 |
| CN | 201096208 | Y | 8/2008 |
| FR | 2687754 | A1 | 8/1993 |
| JP | 9060739 | A | 3/1997 |
| JP | 10213248 | A | 8/1998 |

* cited by examiner

TOP ENTRY PLASTIC BALL VALVE

The present application is the national phase of International Application No. PCT/CN2009/073416, titled "TOP ENTRY PLASTIC BALL VALVE", filed on Aug. 21, 2009, which claims the benefit of priority to Chinese patent application No. 200910040462.5 titled "TOP ENTRY PLASTIC BALL VALVE", filed on Jun. 23, 2009. The entire disclosure thereof is incorporated herein by reference.

FIELD OF THE INVENTION

The invention belongs to the field of plastic ball valves, and particularly relates to a top entry plastic ball valve.

BACKGROUND OF THE INVENTION

With wide application of plastic gas pipelines, plastic ball valve is firstly developed and manufactured in USA and widely applied to plastic gas pipeline systems to meet the needs of forming pipeline systems. People have been gradually realized the superiority of plastic ball valves in respects of performances/price and began to replace metal ball valves with plastic ball valves.

For traditional plastic valves, a small-diameter ball valve is integrated by hot melt welding, and a large-diameter ball valve adopts electric fusion welding. The hot melt welding has simple process, low cost and relative low accuracy; and the electric fusion welding has complex process and high cost.

Presently, the valve structure with hot melt welding commonly adopts an integral side-entry structure, in which a ball body, a valve stem and a sealing ring of one side are assembled in a valve body form one end of the valve body, the diameter of the end is equal to or larger than the diameter of a valve ball chamber; the other sealing ring is mounted on a connecting pipe seat, the valve body and the connecting pipe seat are welded together to form an integral ball valve by hot melt welding or electric fusion welding between the inner cylindrical surface with larger diameter where the valve body assembled in the ball body and the outer cylindrical surface of the connecting pipe seat. The valve stem is buckled with a valve stem cap through the buckling part of the valve stem, and the valve stem cap is buckled with the valve body through the buckling part of the valve stem cap. The two sealing rings are respectively fixed on the valve body and the connecting pipe. In assembly, the valve stem cap is firstly buckled with the valve body through the buckling part, then a sealing ring and a supporting ring thereof are mounted in a sealing ring groove and a supporting ring groove from the end with larger diameter of the valve body, next, the valve stem is mounted from the end with larger diameter of the valve body in a way that the buckling part of the valve stem is buckled in the buckling part of the valve stem cap, and finally, the valve ball is mounted; the sealing rings are mounted on a sealing ring mounting ring of the valve body and a connecting pipe seat sealing ring, then the inner cylindrical surface of the insertion-accepting part of the valve body and the outer cylindrical surface of the connecting pipe are heated and molten on a hot melting machine, and when the two cylindrical surfaces are molten to a certain thickness, the connecting pipe is inserted into the insertion-accepting part of the valve body to a certain depth and gradually cooled by keeping pressure.

Such structure has the following defects:

I. The bottom of the valve stem has an end surface on which an O-shaped sealing ring is mounted through an annular groove provided on the end surface, a plane perpendicular to the valve stem is milled on the valve body correspondingly, the buckling part of the valve stem and the buckling part of the valve stem cap are required to cause the valve stem to maintain a proper force pointing at the outside of the valve body, such that the O-shaped sealing ring on the end surface of the valve stem can seal the end surface of the valve stem by a proper pressing force. However, in such structure, the designed pressing force is obtained through the two buckling parts on three parts, which brings more difficulties for manufacture and assembly;

II. The insertion depth of the connecting pipe in the valve body directly affects the axial distance between two sealing surfaces and influences a pre-stressed force. Large insertion depth causes large pre-stressed force and large torques for opening and closing the valve and serious abrasion; small insertion depth brings small pre-stressed force of the sealing surface, thereby causing a hidden danger of inner leakage. In addition, it is difficult to ensure coincidence of central lines of the valve body and the connecting pipe during insertion, the two central lines often do not coincide and form a certain angle, resulting in uneven pressing force between the sealing rings and the ball body on a whole sealing area;

III. From the view of manufacture, because the two sealing rings are respectively positioned on the valve body and the connecting pipe, and process positioning surfaces for machining mounting rings of the sealing rings are respectively positioned on two mounting rings, the axial distance between the mounting rings of the sealing rings after assembly has an error due to the manufacture of the positioning surfaces.

SUMMARY OF THE INVENTION

The object of the invention is to provide an integral top entry valve body structure to overcome the defects of the prior art.

In order to realize the above object, the invention employs the following technical scheme:

A top entry plastic ball valve comprises a valve stem cap, a valve stem, a valve stem sealing ring, a valve ball sealing ring, a supporting ring for the valve ball sealing ring, a valve ball, a connecting pipe and a valve body. A hollow valve ball chamber is provided inside the valve body, the valve body is provided with a valve cover hole just above the valve ball chamber, the width of the valve cover hole is larger than the diameter of the valve ball, the ball valve also comprises a valve cover which is provided with a valve stem shaft hole for allowing the valve stem to pass through and corresponds to the valve cover hole so that the valve cover can cover the valve cover hole and can be fusion-bonded to the valve body.

The plastic ball valve of the invention is characterized in that the valve cover hole is provided just above the valve ball chamber for mounting two valve ball sealing rings and a valve ball, and the valve cover covers the valve cover hole and adopts end surface welding through hot melt, thereby avoiding the need for electric fusion welding in manufacture of large-diameter valves.

In the above technical scheme, said valve cover hole is in the shape of a square, or a rectangle, or a circle, or an ellipse and parallel to the axial line of the valve body.

An annular plane having a certain width is provided around the valve cover hole to be taken as a melt adhesive surface which is parallel to the axial line of the valve body, and the valve body and the valve cover are in end surface welding through the melt adhesive surface by hot melt.

As another structure, a conical surface having a certain width is provided around the valve cover hole to be taken as a melt adhesive surface, the axial line of the melt adhesive is perpendicular to the axial line of the valve body, and the valve body and the valve cover are in end surface welding through the melt adhesive surface by hot melt.

The right end and the left end of the valve body are respectively provided with a connecting pipe seat, the side of said each connecting pipe seat fusion-welded with the connecting pipe is provided with an outer end surface ring which is perpendicular to the axial line of the valve body, and the valve body and the connecting pipe are in end surface welding through the outer end surface rings by hot melt. The outer end surface rings are perpendicular to the axial line of the valve body, and because the outer end surface rings are close to the valve ball chamber, the sealing ring groove and the sealing ring supporting ring groove can be turned conveniently by a numerical control lathe; and another important function of the outer end surface rings lies in forming end surface welding with the connecting pipe by hot melt, avoiding the need for electric fusion welding process in manufacture of large-diameter ball valves.

The connecting pipe is provided with a fusion welding surface used for being welded with the valve body by hot melt, and said fusion welding surface is of an annular end surface or a conical surface and corresponds to the outer end surface ring which is an annular plane or a conical surface.

Both sides of the valve ball chamber of the valve body are respectively provided with a positioning end surface for the mounting ring for the valve ball sealing ring and a positioning end surface for the supporting ring for the valve ball sealing ring. The mounting ring positioning end surface for the valve ball sealing ring and the supporting ring positioning end surface for the valve ball sealing ring are machined on both sides of the valve ball chamber of the valve body, that is to say the two valve body sealing rings and the two supporting rings for the valve ball sealing rings are mounted on the valve body, which is different from two valve sealing rings of the traditional ball valve in mounting mode and position, and as for traditional ball valve sealing rings, one is mounted in from one end of the valve body, and the other is mounted on the connecting pipe.

Said valve ball chamber is an inner cylindrical surface coaxial with the valve body and has an indentation at the valve cover hole, said valve cover is provided with an inner cylindrical surface of the valve ball chamber for supplementing the indentation, the valve body is further provided with an inner cylindrical surface fitted with the outer cylindrical surface of the valve ball sealing ring, the inner cylindrical surface is in the shape of a circular ring concentric with the valve body, the inner cylindrical surface has an indentation on the valve body, and the valve cover is provided with an inner cylindrical surface of the valve ball sealing ring for supplementing the indentation.

The main body of the valve cover is a planar ring, and the planar ring has the same size and shape with the valve cover hole, a perpendicular cylindrical ring is provided just above the planar ring, the cylindrical ring is provided with the valve stem shaft hole, the inner wall of the cylindrical ring is provided with an inner groove for mounting the valve stem sealing ring and an annular groove buckled with the buckling part on the valve stern, the outer wall of the cylindrical ring is provided with an annular protrusion fitted with an annular groove of the inner hole on the valve stem cap.

The invention has the following assembly process:

An axial sealing ring of the valve stem and a valve stem end surface sealing ring are firstly mounted in corresponding sealing ring mounting grooves on the valve body, and then the valve stem is mounted in so that the valve stem is buckled with an axial limiting buckling part on the valve body; two valve ball sealing rings are mounted in corresponding sealing ring mounting grooves on the valve body, then a ball body is mounted in the valve ball chamber, and next, two supporting rings for the valve ball sealing rings are respectively pressed in the valve body from the right side and the left side of the valve body; the valve cover, two connecting pipes and the valve body are fusion-welded together through hot melt; and finally, the valve stem cap is assembled.

In the invention, a top entry structure of the valve cover is provided just above the valve body, wherein two valve ball sealing rings are directly mounted on the valve body such that the axial distance between the two sealing rings can be accurately controlled, and accordingly, the pre-stressed force of the sealing surface and the torsional moment of the valve stem can be effectively controlled, thereby solving the problem in the prior art of low qualification rate because of inner leakage and overlarge torsional moment caused by inefficient control of the axial distance between sealing rings. In addition, because end surface hot melt welding or conical surface hot melt welding is used between the valve cover and the valve body and between the connecting pipes and the valve body, there is no need to use electric fusion welding which has high cost and complex fusion welding process in manufacture of large-diameter valves.

DETAILED DESCRIPTION OF THE PREFERRED EMBODIMENT

Figure 1:
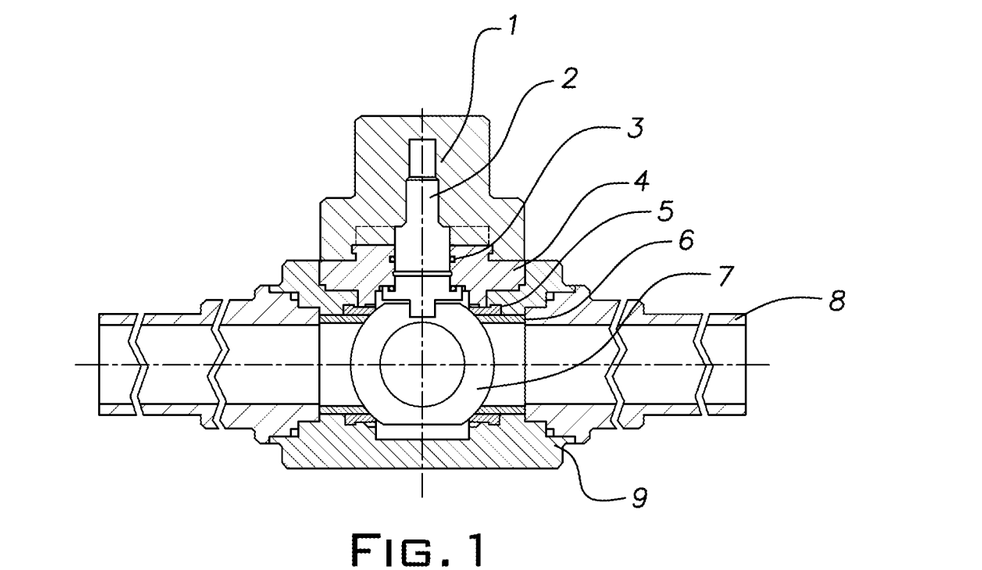
FIG. 1 is a diagram of the whole structure of the PE ball valve of the invention.

The invention is further described by combining the drawings:

Referring to the diagram of the whole structure of the PE ball valve as shown in FIG. 1, the plastic ball valve of the invention comprise a valve stem cap 1, a valve stem 2, a valve stem sealing ring 3, a valve cover 4, a valve ball sealing ring 5, a supporting ring 6 for the valve ball sealing ring, a valve ball 7, a connecting pipe 8 and a valve body 9.

Figure 2:
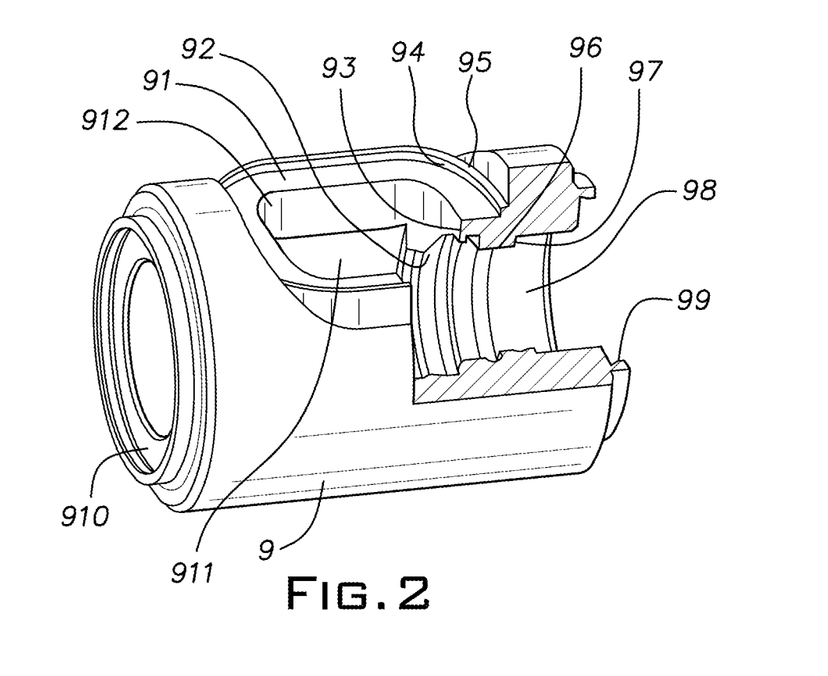
FIG. 2 is a structural diagram of the valve body of the PE ball valve of the invention.

Referring to the structural diagrams of the valve body of the PE ball valve as shown in FIG. 2, said valve body 9 substantially is a cylinder which is internally provided with a series of cylindrical holes communicated with each other, and the axial lines of the cylindrical holes coincide with the cylinder body of the valve body in axial direction. The valve body 9 comprises a melt adhesive surface 91 of the valve cover, a circumferential positioning surface 94 of the valve cover, an axial positioning surface 95 of the valve cover, an inner cylindrical surface 92 fitting with the valve ball sealing ring 5, a mounting ring groove 93 for the valve ball sealing ring, an axial positioning circumferential end surface 96 of the supporting ring 6 for the valve ball sealing ring, an axial positioning circumferential end surface 97 of the connecting pipe 8, a radial positioning surface 98 of the connecting pipe 8, a melt adhesive containing groove 99, a melt adhesive end surface 910 used for being fusion-welded with the connecting pipe 8, a valve ball chamber 911, a valve cover hole 912. The melt adhesive surface 91 is a flat surface or a conical surface with rectangular, or square, or circular or elliptical inner and outer profiles. If being a flat surface, the melt adhesive surface 91 is parallel to the axial line of the valve body 9; if being a conical surface, the axial line of the melt adhesive surface 91 is perpendicular to the axial line of the valve body 9 and coincides with the normal line of the outer cylindrical surface of the valve body. The melt adhesive surface 91 is used for enabling the valve cover to be welded with the valve body by being welded with the fusion welding end surface on the valve cover 4 through hot melt. The inner cylindrical surface 92 on the valve body 9 is fitted with the outer cylindrical surface of the valve ball sealing ring 5 and is in the shape of a circular ring concentric with the valve body. The inner cylindrical surface 92 has an indentation on the valve body 9, and the indentation is positioned on the valve cover 4. The mounting ring 93 for the valve ball sealing ring of the valve body 9 is a circular ring with a square cross section and is used for positioning the valve sealing ring 5 in axial direction. The axial positioning surface 95 of the valve cover is an annular plane with the central line coinciding with the central line of the circumferential positioning surface 94 and is used for being fitted with the axial positioning end surface 48 of the valve cover to limit the valve cover 4 in axial direction. The axial positioning circumferential end surface 96 of the supporting ring 6 for the sealing ring is a planar ring perpendicular to the axial line of the valve body and is used for positioning the supporting ring 6 for the sealing ring of the valve body 9 in axial direction. The axial positioning circumferential end surface 97 of the connecting pipe 8 of the valve body 9 is an annular plane perpendicular to the axial line of the valve body and is used for positioning the connecting pipe 8 in axial direction. The radial positioning surface 98 of the connecting pipe 8 of the valve body 9 is an inner cylindrical surface concentric with the valve body and is used for positioning the connecting pipe 8 in radial direction. The melt adhesive surface 910 of the connecting pipe is an annular plane perpendicular to the axial line of the valve body or a conical surface concentric with the axial line of the valve body and is used for being welded with the connecting pipe 8 through end surface hot melt. The valve ball chamber 911 is an inner cylindrical surface concentric with the valve body and has an indentation at the valve cover hole 912, and the indentation is positioned on the valve cover 4. The valve cover hole 912 is in the shape of a circle, or a square, or a rectangle, penetrates through the valve ball chamber 911 and is used for combining with the cylindrical surface 41 of the valve ball chamber of the valve cover 4 to form an integral inner cylindrical surface of the valve ball chamber 911.

Figure 3A:
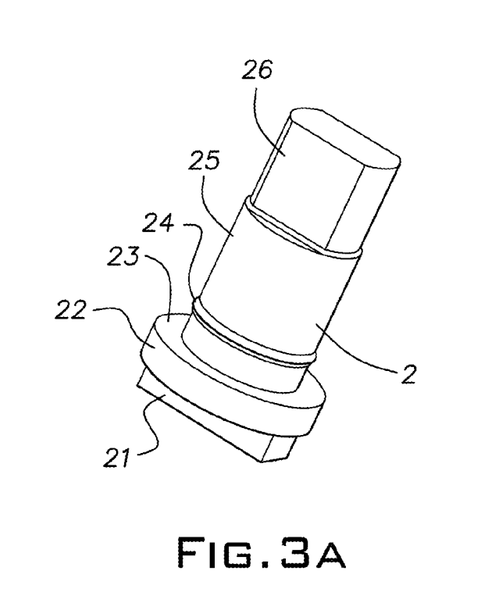
FIGS. 3A and 3B are structural diagrams of the valve stem of the PE ball valve of the invention.
Figure 3B:
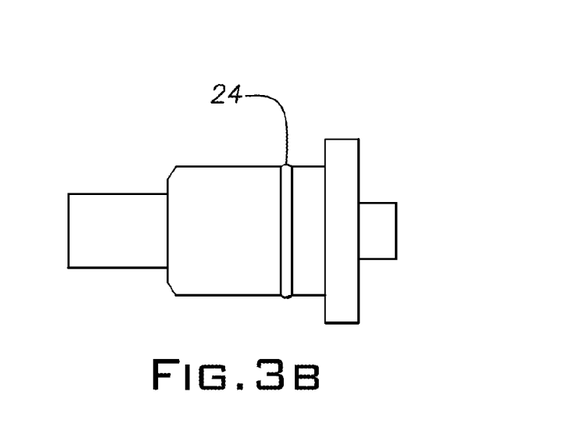

Referring to the structural diagrams of the valve stem as shown in FIGS. 3A and 3B, the valve stem 2 comprises a valve ball poke block 21, a valve stem end surface sealing ring 22, an end surface sealing plane 23, an axial positioning buckling part 24 of the valve stem, a cylindrical section 25 of the valve stem and a torsional section 26 of the valve stem. Said valve stem end surface sealing ring 22 is a cylindrical ring concentric with the valve stem 2, and the valve stem end surface sealing plane is positioned on the valve stem end surface sealing ring 22 and perpendicular to the axial line of the valve stem 2; said axial positioning buckling part 24 of the valve stem is positioned on and concentric with the cylindrical section 25 of the valve stem and protrudes from the cylindrical section 25 of the valve stem, the positioning buckling part has a conical cross section which is concentric with the cylindrical section 25, and the biggest bottom surface of the positioning buckling part is a plane closing to the valve stem end surface sealing ring 22 and perpendicular to the axial line of the valve stem. The buckling part 24 is buckled with the buckling part of the valve stem on the valve cover 4 to limit the distance of the valve stem towards the valve ball. The torsional section 26 of the valve stem 2 are two parallel planes cut on the a segment of a cylinder body concentric with the valve stem and smaller than the cylindrical section 25 in diameter along the axial line of the valve stem, and are used for being fitted with a torsional hole in the valve stem cap and giving a torque to the valve stem to drive the valve ball to rotate.

Figure 4:
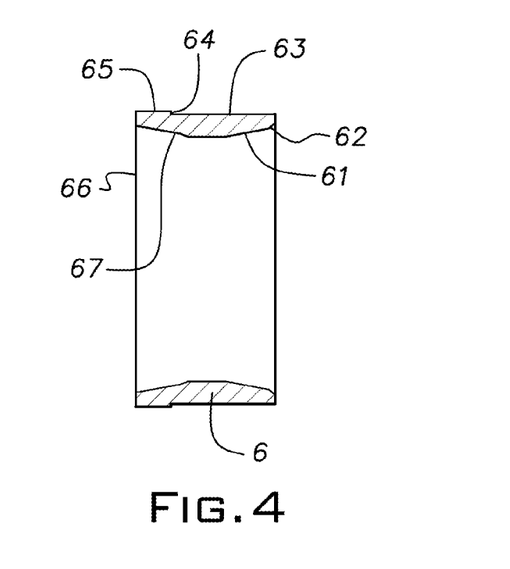
FIG. 4 is a structural diagram of the supporting ring for the sealing ring of the PE ball valve of the invention.

Referring to the structural diagram of the supporting ring for the valve ball sealing ring as shown in FIG. 4, the supporting ring 6 substantially is in the shape of a cylinder, the inner circular surface comprises two conical surfaces 61, 67 and a cylindrical surface, and the two conical surfaces coincide with the axle center of the cylindrical surface and coincide with two outer cylindrical surfaces 63, 65. After assembly, a conical surface 62 is provided closing to the valve ball. The outer cylindrical surface 63 is fitted with the inner cylindrical surface of the valve ball sealing ring 5. A circumferential end surface 64 is fitted with the circumferential end surface 96 on the valve body 9 to position the supporting ring 6 in axial direction. A circumferential end surface 66 is provided away from the valve ball and fitted with an axial positioning end surface 83 of the supporting ring of the connecting pipe 8.

Figure 5:
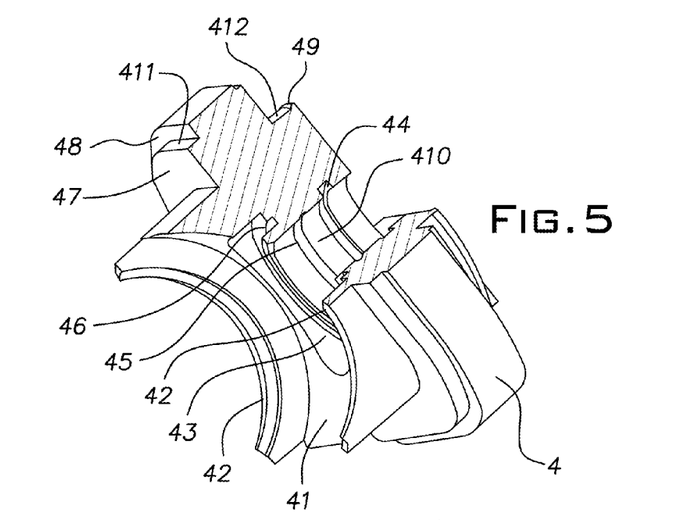
FIG. 5 is a structural diagram of the valve cover of the PE ball valve of the invention.

Referring to the structural diagram of the valve cover as shown in FIG. 5, the valve cover 4 mainly comprises an inner cylindrical surface 41 of the valve ball chamber, an inner cylindrical surface 42 of the valve ball sealing ring, a circumferential end surface 43 of the valve stern, a mounting groove 46 for the valve stem end surface sealing ring, an axial positioning buckling groove 45 of the valve stern, a fusion welding end surface 47, an axial positioning end surface 48 of the valve cover, a radial positioning cylindrical surface 411 of the valve cover, a limiting convex ring 49 of the valve stem cap, a limiting cylindrical surface 412 of the valve stem cap, a valve stem shaft hole 410 and a mounting ring 44 for the axial sealing ring of the valve stern. The inner cylindrical surface 41 of the valve ball chamber and the inner cylindrical surface 911 of the valve ball chamber of the valve body 9 form an integral inner cylindrical surface of the valve ball; and the inner cylindrical surface 42 of the valve ball sealing ring and the inner cylindrical surface 92 of the sealing ring of the valve body 9 form an integral radial positioning inner cylindrical ring of the valve ball sealing ring. The circumferential end surface 43 of the valve stem is parallel to the axial line of the valve body 9, perpendicular to the valve stemshaft hole 410 and is provided with the mounting groove 46 for the valve stem end surface sealing ring, and the axial line of the mounting groove 46 coincides with the axial line of the valve stem shaft hole 410; the axial positioning buckling groove 45 of the valve stem is an annular groove in the shape of a square, or a rectangle, or a triangle, the axial line of the axial positioning buckling groove coincides with the axial line of the valve shaft hole. The axial line of the fusion welding end surface 47 is an annular plane perpendicular to the valve stem shaft hole 410 or a conical surface with the axial line coinciding with the axial line of the valve stem shaft hole, is used for being welded with the melt adhesive surface 91 on the valve body 9 through hot melt process, and has the same profile with the melt adhesive surface of the valve cover on the valve body 9. The axial positioning end surface 48 of the valve cover is parallel to the fusion welding end surface 47 and the circumferential end surface 43 of the valve stern, is fitted with the axial positioning surface 95 of the valve cover on the valve body 9, has the same shape and size with the axial positioning surface 95, and plays a role of limiting the valve cover 4 in axial direction. The axle center of the radial positioning cylindrical surface 411 of the valve cover coincides with the axle center of the valve stem shaft hole 410 and is fitted with the circumferential positioning surface 94 on the valve body 9 to limit the valve cover in radial direction. The limiting cylindrical surface 412 of the valve stem cap is concentric with the valve stem shaft hole 410 and is provided with an annular protrusion, i.e. the limiting convex ring 49 of the valve stem cap, with the cross section in the shape of a circle, or a rectangle, or an ellipse, or a rhombus at the upper part. The limiting convex ring 49 of the valve stem cap is fitted with a limiting groove of the valve stemcap to limit the valve stem cap 1.

Figures 6A, 6B, 6C:
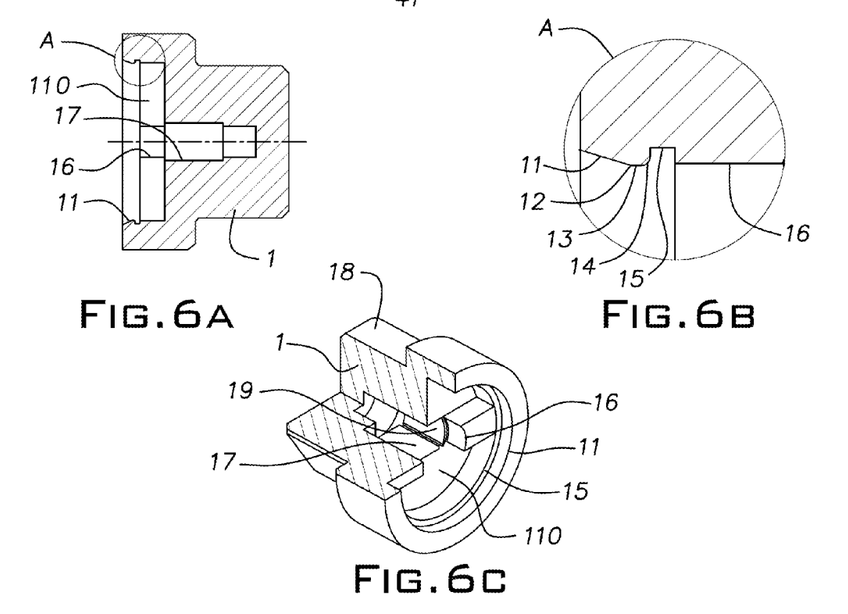
FIGS. 6A, 6B and 6C are structural diagrams of the valve stem cap of the PE ball valve of the invention.

The structural diagram of the valve stem cap as shown in FIGS. 6A-6C include a sectional axial side view (FIG. 6C) of a quarter of the valve stem cap 1, a sectional view (FIG. 6A) and an enlargement view (FIG. 6B) of part A. Said valve stem cap 1 comprises a torsional hexagonal prism 18, a rotary limiting block 16 of the valve stem cap, a conical surface 11 of a cap mouth, a torsional hole 17 fitted with the torsional section 26 of the valve stem, and an end surface 110 between the rotary limiting block 16 and the torsional hole 17. The cross section of the buckling groove 15 is in the shape of a square, or an ellipse, or a circle, or a triangle, and the axial line of the buckling groove coincides with the axial lines of the torsional hole 17 and the conical surface 11 of the cap mouth. Said buckling groove 15 closes to the wall surface of the cap mouth and is tangential to the conical surface 11 of the cap mouth at the joint position through an arc surface 12, a cylindrical surface 13 and an arc surface 14 to form a smooth curved surface, thereby facilitating the limiting convex ring 49 of the valve stem cap of the valve cover to smoothly enter the buckling groove 15 and avoiding damage to the limiting convex ring 49 of the valve stem cap in entry. Said torsional hole consists of two parallel planes 17 and two opposite cylindrical surfaces having the same diameter.

Figure 7:
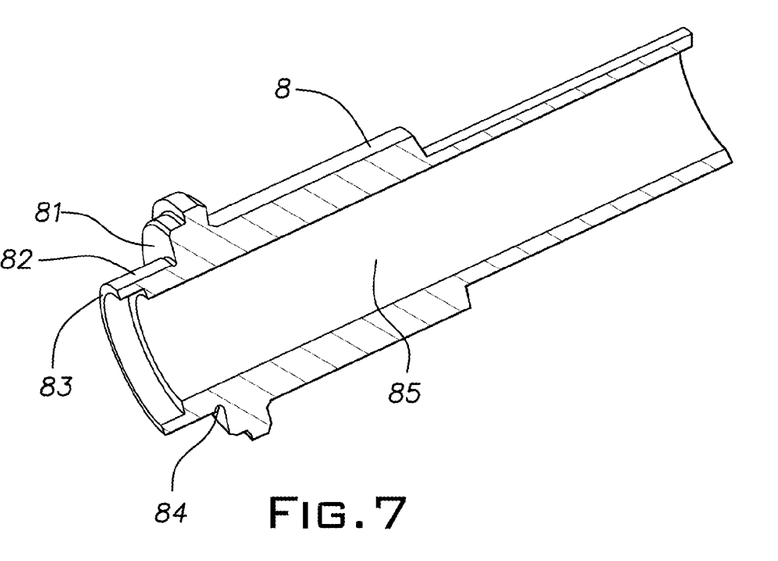
FIG. 7 is a structural diagram of the connecting pipe of the PE ball valve of the invention.

Referring to the structural diagram of the connecting pipe as shown in FIG. 7, the connecting pipe 8 is substantially is a revolution body with a round cross section, and comprises a pipe body 85, an axial positioning end surface 83 of the supporting ring used for limiting the supporting ring 6 for the valve ball sealing ring in axial direction, a radial limiting cylindrical surface 82, a fusion welding end surface 81 and an adhesive containing groove 84. Said limiting end surface 83 contacts with the circumferential end surface 66 of the supporting ring 6 and limits the supporting ring 6 in axial direction. Said fusion welding surface 81 is an annular plane perpendicular to the axial line of the pipe body 85 or a conical surface coinciding with the axial line of the pipe body 85 and is used for being welded with the melt adhesive surface 910 of the connecting pipe 8 on the valve body 9 through hot melt. Said adhesive containing groove is an annular groove with the cross section in the shape of a square, or a rectangle, or a circle, or other shapes and is used for containing excess molten plastic during hot melt insertion.

The invention claimed is:

1. A top entry plastic ball valve comprising a valve stem cap (1), a valve stem (2), a valve stem sealing ring (3), a valve ball sealing ring (5), a supporting ring (6) for the valve ball sealing ring, a valve ball (7), a connecting pipe (8), and a valve body (9), wherein a hollow valve ball chamber (911) is provided inside the valve body (9), characterized in that the valve body (9) is provided with a valve cover hole (912) just above the valve ball chamber (911), the width of the valve cover hole (912) is larger than the diameter of the valve ball (7), the ball valve also comprises a valve cover (4) which is provided with a valve stem shaft hole (410) for allowing the valve stem (2) to pass through and corresponds to the valve cover hole (912) so that the valve cover (4) can cover the valve cover hole (912) and can be fusion-bonded to the valve body (9);

the right end and the left end of the valve body (9) are respectively provided with a connecting pipe seat, the side of said each connecting pipe seat fusion-welded with the connecting pipe (8) is provided with an outer end surface ring (910) which is perpendicular to the axial line of the valve body (9), and the valve body (9) and the connecting pipe (8) are in end surface welding through the outer end surface rings (910) by hot melt;

two sides of the valve ball chamber (911) of the valve body (9) are respectively provided with a positioning end surface for the mounting ring for the valve ball sealing ring and a positioning end surface for the supporting ring for the valve ball sealing ring;

the valve ball chamber (911) is an inner cylindrical surface coaxial with the valve body (9) and has an indentation at the valve cover hole (912), the valve cover (4) is provided with an inner cylindrical surface (41) of the valve ball chamber for supplementing the indentation, the valve body (9) is further provided with an inner cylindrical surface (92) fitted with the outer cylindrical surface of the valve ball sealing ring (5), the inner cylindrical surface (92) is in the shape of a circular ring concentric with the valve body (9), the inner cylindrical surface (92) has an indentation on the valve body (9), and the valve cover (4) is provided with an inner cylindrical surface (42) of the valve ball sealing ring for supplementing the indentation.

2. The top entry plastic ball valve according to claim 1, characterized in that the valve cover hole (912) is in the shape of a square, or a rectangle, or a circle, or an ellipse and parallel to the axial line of the valve body (9).

3. The top entry plastic ball valve according to claim 1, characterized in that an annular plane is provided around the valve cover hole (912) to be taken as a valve cover melt adhesive surface (91) which is parallel to the axial line of the valve body (9), and the valve body (9) and the valve cover (4) are in end surface welding through the melt adhesive surface (91) by hot melt.

4. The top entry plastic ball valve according to claim 1, characterized in that a conical plane is provided around the valve cover hole (912) to be taken as a valve cover melt adhesive surface (91) which is perpendicular to the axial line of the valve body (9), and the valve body (9) and the valve cover (4) are in end surface welding through the melt adhesive surface (91) by hot melt.

5. The top entry plastic ball valve according to claim 1, characterized in that the connecting pipe (8) is provided with a fusion welding surface (81) used for being welded with the valve body (9) by hot melt, and the fusion welding surface (81) is of an annular end surface or a conical surface and corresponds to the outer end surface ring (910) which is an annular plane or a conical surface.

6. The top entry plastic ball valve according to claim 1, characterized in that the main body of the valve cover (4) is a planar ring (47), the planar ring (47) has the same size and shape with the valve cover hole (912), a perpendicular cylindrical ring is provided just above the planar ring (47), the cylindrical ring is provided with the valve stem shaft hole (410), the inner wall of the cylindrical ring is provided with an inner groove (44) for mounting the valve stem sealing ring (3) and an annular groove (45) buckled with a buckling part on the valve stem (2), the outer wall of the cylindrical ring is provided with an annular protrusion (49) fitted with an annular groove of the inner hole on the valve stem cap (1).

\* \* \* \* \*